(12) United States Patent
Gu et al.

(10) Patent No.: US 12,382,139 B2
(45) Date of Patent: *Aug. 5, 2025

(54) TIME MARKING CHAPTERS IN MEDIA ITEMS AT A PLATFORM USING MACHINE-LEARNING

(71) Applicant: Google LLC, Mountain View, CA (US)

(72) Inventors: Chenjie Gu, Mountan View, CA (US); Wei-Hong Chuang, Mountain View, CA (US); Min-Hsuan Tsai, San Jose, CA (US); Jianfeng Yang, Mountain View, CA (US); Ji Zhang, Mountain View, CA (US); Honglu Zhou, Highland Park, NJ (US); Hassan Akbari, New York, NY (US)

(73) Assignee: Google LLC, Mountain View, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/244,625

(22) Filed: Sep. 11, 2023

(65) Prior Publication Data
US 2023/0421855 A1 Dec. 28, 2023

Related U.S. Application Data

(63) Continuation of application No. 17/835,547, filed on Jun. 8, 2022, now Pat. No. 11,758,233.

(51) Int. Cl.
*H04N 21/472* (2011.01)
*G11B 27/34* (2006.01)

(52) U.S. Cl.
CPC ....... *H04N 21/47217* (2013.01); *G11B 27/34* (2013.01)

(58) Field of Classification Search
CPC .. H04N 21/47217; H04N 5/147; G11B 27/34; G06V 10/764; G06V 10/82;
(Continued)

(56) References Cited

U.S. PATENT DOCUMENTS 9,317,531 B2  4/2016  Baker
10,805,647 B2  10/2020  Zhang
(Continued)

FOREIGN PATENT DOCUMENTS

CN  112804580 A  5/2021

OTHER PUBLICATIONS

Bastian L., et al., "Computer Vision-ECCV 2016," 14th European Conference Proceedings, Part II , Springer International Publishing, 2016, 44 Pages.
(Continued)

*Primary Examiner* — Eric J Yoon
(74) *Attorney, Agent, or Firm* — Lowenstein Sandler LLP

(57) ABSTRACT

Methods and systems for time marking of media items at a platform using machine-learning are provided herein. An indication of a identified media item is provided as input to a machine-learning model and one or more outputs of the machine-learning model is obtained. The one or more obtained outputs comprise time marks identifying each of the plurality of content segments of the media item. Each of the plurality of content segments is associated with a segment start indicator for a timeline of the media item. A resulting duration is determined of a combination of the plurality of content segments for which the time marks were obtained from the one or more of outputs of the machine-learning model. Responsive to determining that the resulting duration is less than the duration of the media item, one or more further inputs is provided to the machine learning model.

20 Claims, 7 Drawing Sheets

(58) Field of Classification Search
CPC .... G06V 20/47; G06V 20/49; G06F 16/7328; G06F 16/75; G06N 20/00
See application file for complete search history.

(56) References Cited

U.S. PATENT DOCUMENTS

| | | |
|---|---|---|
| 2003/0093790 A1 | 5/2003 | Logan |
| 2011/0224971 A1 | 9/2011 | Moore |
| 2015/0050006 A1* | 2/2015 | Sipe .................. H04N 9/87 386/241 |
| 2018/0210874 A1 | 7/2018 | Fuxman et al. |
| 2019/0147105 A1 | 5/2019 | Chu |
| 2020/0195983 A1 | 6/2020 | Chao |
| 2021/0074171 A1 | 3/2021 | Agley et al. |
| 2021/0158845 A1 | 5/2021 | Sethi |

OTHER PUBLICATIONS

Botian S., et al., "Dense Procedure Captioning in Narrated Instructional Videos," Proceedings of the Th Annual Meeting of the Association for Computational Linguistics, 2019, pp. 6382-6391.

PCT Notification of Transmittal of the International Search Report and the Written Opinion of the International Searching Authority for PCT Application No. PCT/US2023/024859, mailed Aug. 23, 2023, 14 pages.

Anonymous: "Video Chapters", YouTube Help, Jun. 6, 2022, 1 page, XP093073648,retrieved from the Internet: http://web.archive.org/web/20220606093653/https://support.google.com/youtube/answer/9884579 [retrieved on 2023-08-15].

Youtube Creators: "How to Add Chapters to Your Videos Using video Timestamps", Jun. 16, 2020, 1 page, XP093073650, retrieved from the Internet: URL:https://www.youtube.com/watch?v=b1 Fo_M_tj6w (retrieved on 2023-08-15].

YouTube video by username Howfinity, "How to Add Automatic Chapters on YouTube Videos," published Jul. 15, 2021, downloaded from https://www.youtube.com/watch?v=32Tzi HAcKQg (Year: 2021).

Kasana, "YouTube tests AI-generated video chapter to make creators' lives easier," Inverse website, dated Nov. 24, 2020, downloaded from https://www.inverse.com/input/culture/youtube-tests-waters-with-bot-generated-video-chapters (Year: 2020).

Batra, S., et al., "Building Adaptive Acceptability Classifiers for Neural NLG." In Proceedings of the 2021 Conference on Empirical Methods in Natural Language Processing, 2021, pp. 682-697.

Challa, A., et al., "Generate, Filter, and Rank: Grammaticality Classification for Production-Ready NLG Systems," 2019, 10 Pages. Retrieved from the Internet: [https://arxiv.org/pdf/1904.03279.pdf].

Dusek, O., et al., "Evaluating Semantic Accuracy of Data-to-Text Generation with Natural Language Inference," in Proceedings of the 13th International Conference on Natural Language Generation, 2020, pp. 131-137.

\* cited by examiner

TIME MARKING CHAPTERS IN MEDIA ITEMS AT A PLATFORM USING MACHINE-LEARNING

RELATED APPLICATIONS

This application is a continuation of U.S. patent application Ser. No. 17/835,547 filed Jun. 8, 2022, the entire content of which is hereby incorporated by reference.

TECHNICAL FIELD

Aspects and implementations of the present disclosure relate to time marking chapters in media items at a platform using machine-learning.

BACKGROUND

A platform (e.g., a content platform) can transmit (e.g., stream) media items to client devices connected to the platform via a network. A media item can include a video item and/or an audio item, in some instances. Users can consume the transmitted media items via a graphical user interface (GUI) provided by the platform. In some instances, one or more content segments of a media item may include content which is more informative to a user than other content segments, such as because it does not duplicate information the user already has, and does not assume knowledge the user does not yet have. The user may wish to easily access the informative content segment(s) of the media item without consuming the entire media item via the GUI.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for time marking of media items at a platform using machine-learning. In an implementation, a method includes identifying a media item by one or more users of a platform. An indication of the identified media item is provided as input to a machine-learning model and one or more outputs of the machine-learning model is obtained. The input to the machine-learning model comprises feature data of the media item and a chapter label indicative of a start time of a first content segment of the media item, wherein the machine-learning model is trained using different feature types of historical media items to predict, for a given media item, a plurality of content segments of the given media item each depicting, to the one or more users, a distinct section of the media item. The one or more obtained outputs comprise time marks identifying each of the plurality of content segments of the media item. Each of the plurality of content segments is associated with a segment start indicator for a timeline of the media item. A resulting duration is determined of a combination of the plurality of content segments for which the time marks were obtained from the one or more outputs of the machine-learning model. Responsive to determining that the resulting duration is less than the duration of the media item, one or more further inputs is provided to the machine learning model. The one or more further inputs comprise the feature data and an updated chapter label indicative of a start time of a content segment following the plurality of content segments for which the time marks were obtained.

A further aspect of the disclosure provides a system comprising: a memory; and a processing device, coupled to the memory, the processing device to perform a method according to any aspect or embodiment described herein.

A further aspect of the disclosure provides a non-transitory computer-readable medium comprising instructions that, responsive to execution by a processing device, cause the processing device to perform operations according to any aspect or embodiment described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
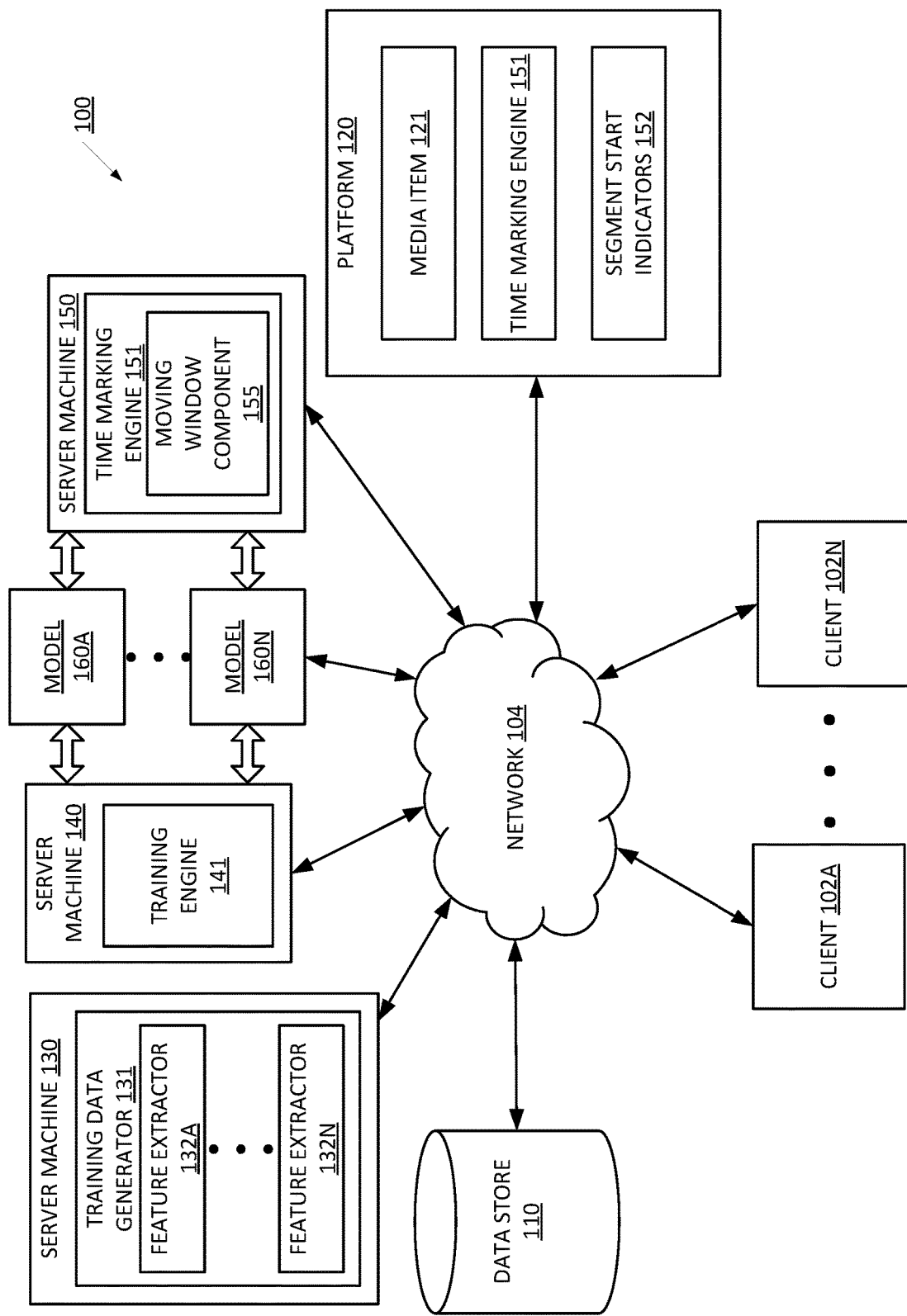
FIG. 1 illustrates an example system architecture, in accordance with implementations of the present disclosure.

Aspects of the present disclosure relate to determining and time marking content segments for media items at a platform using machine-learning. A platform (e.g., a content platform, etc.) can enable a user to access a media item (e.g., a video item, an audio item, etc.; for example, a video item may comprise a video captured by a video camera and optionally include a soundtrack of audio data (e.g. captured by a microphone of the video camera), and an audio item may be audio data captured by a microphone) provided by another user of the platform. For example, a first user of a content platform can provide (e.g., upload) a media item to a content platform via a graphical user interface (GUI) associated with the content platform to a client device of the first user. A second user of the content platform can access the media item provided by the first user via the content platform GUI at a client device associated with the second user. In some instances, a media item can include one or more content segments. In a first example, if the media item includes video content relating to an academic lecture, a first content segment of the media item can depict a discussion of a first topic of the lecture and a second content segment of the media item can depict a discussion of a second topic of the lecture. In a second example, if the media item includes video content and/or audio content relating to a music concert, a first content segment can depict a performance of a first song at the music concert and a second content segment can depict a performance of a second song at the music concert.

In conventional systems, a creator of a media item can provide to the platform an indication of respective content segments of a media item that the creator wishes to present as chapters of the media item to the users of the platform. A chapter can refer to a content item between two time periods of the timeline. In accordance with the first example, a creator of the media item relating to the academic lecture can provide to the content platform an indication of a first time period of a timeline of the media item that corresponds to the first content segment depicting the discussion of the first topic of the lecture and another indication of a second time period of the media item timeline that corresponds to the second content segment depicting the discussion of the second topic of the lecture. When a user accesses the media item, the content platform GUI can include a GUI element (e.g., a segment start indicator) indicating the first time period corresponding to the first content segment highlighted by the media item creator and/or the second time period corresponding to the second content segment highlighted by the media item creator. Each segment start indicator can indicate the beginning of a chapter of the media item. The user can cause the first content segment (e.g., a first chapter) and/or the second content segment (e.g., a second chapter) to be displayed via the content platform GUI by engaging with (e.g., clicking, selecting, tapping, etc.) the GUI element. Accordingly, the user can access the first content segment, the second content segment, or other content segments (e.g., the segments that are highlighted by the media item creator) without consuming the entire media item. In accordance with the second example, the creator of the media item relating to the music concert can provide an indication of a first time period of the media item timeline at which the performance of the first song begins and/or another indication of a second time period of the media item timeline at which the performance of the second song begins. The content platform GUI can include a GUI element indicating the start of the first chapter and/or the second chapter, as described above.

It can take a significant amount of time and computing resources for a media item creator to determine which content segments to highlight (e.g., mark as chapters) for users and to provide an indication of such content segments to a platform. For example, the academic lecture depicted by the media item can be long (e.g., can last one hour, two hours or more, etc.) and can cover a large number of topics. It can take a significant amount of time for the media item creator to consume the media item, accurately determine a respective time period of the media item timeline that corresponds to a respective topic, and provide an indication of the content segment at the determined respective time period to the platform. As the media item creator may need to consume one or more portions of the media item several times to provide accurate segmenting, computing resources of the client device that enable the media item creator to consume the media item can be unavailable for other processes, which can decrease overall efficiency and increase overall latency of the client device.

Aspects of the present disclosure address the above and other deficiencies by providing techniques for determining and time marking particular content segments (e.g., chapters) of media items at a platform using machine-learning. A media item creator can provide a media item to a platform for access by users of the platform. The media item can correspond to a video item and/or an audio item. Before the media item is made accessible to the platform users, an indication of the media item can be provided as input to a machine-learning model that is trained to predict, for a given media item, time marks indicative of different content segments of the given media item. The indication of the media item may be the media item itself, or data specifying a location in a database at which the media item is located and which is accessible to the machine-learning model. In a further example, described in more detail below, the indication of the media items comprises data derived from the media item, such as feature data (e.g., video feature data, audio feature data, and/or text feature data) representative of one or more particular features of the media item. The time marks can depict distinct sections of the media item to platform users. The machine-learning model can be trained using historical data associated with other media items that have been previously provided (e.g., by media item creators) to the platform. For example, the machine-learning model can be trained using historical data that includes an indication of a respective media item that was previously provided to the platform and indications of different content segments of the respective media item. Further details regarding training the machine-learning model are provided herein.

Responsive to providing an indication of the media item as input to the machine-learning model, the platform can obtain one or more outputs of the model. The one or more outputs can include time marks indicating each identified content segment of the media item. The platform can associate each identified content segment of the media item with a segment start indicator for a timeline of the media item. The platform can provide the media item to one or more client devices associated with users of the platform (e.g., in response to one or more requests) for presentation of the media item to the users. The platform can also provide, with the media item, an indication of each segment start indicator associated with the media item. The one or more client devices can update a user interface (UI) associated with the platform to include one or more UI elements corresponding to the segment start indicators at a portion of a timeline for the media item that includes the content segment associated with each segment start indicator. Responsive to detecting that the user has engaged with the UI element, the platform can initiate playback of the content segment via the platform UI. Accordingly, users of the platform can access specific content segments of the media item without consuming the entire media item. This permits more efficient access to content since users of the platform since, compared to playing the media item from a randomly selected location, there is a higher chance of accessing the media item starting at a location where it is comprehensible (i.e., not a location midway through an explanation, an anecdote or a musical structure). Thus, the user can obtain comprehensible information from the media item more rapidly.

Aspects of the present disclosure cover techniques to enable users of a platform accessing a media item to provide indications of time marks for particular or distinctive content segments of the media item. As soon as, or soon after, a media item is provided to a platform, the platform can identify the different content segments of the media item based on outputs of a trained machine-learning model. Accordingly, segment start indicators for the media item can be automatically (without user input identifying media item segments in any way) determined before the media item is accessible by the platform users, and therefore each user accessing the media item is able to access the particular content segments of the media item without consuming the entire media item. By automatically determining one or more distinct content segments of a media item based on output(s) of a machine-learning model, it is not necessary for a creator associated with the media item to consume the media item (sometimes multiple times) to identify content segments that the creator thinks will be distinct to users and accurately designate such content segments to be associated with one or more segment start indicators. Accordingly, computing resources at a client device associated with the media item creator and/or the platform are reduced and are available for other processes, which increases an overall efficiency and decreases an overall latency for the system.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third-party platform can provide other services associated media items 121. For example, a third-party platform can include an advertisement platform that can provide video and/or audio advertisements. In another example, a third-party platform can be a video streaming service provider that produces a media streaming service via a communication application for users to play videos, TV shows, video clips, audio, audio clips, and movies, on client devices 102 via the third-party platform.

In some embodiments, a client device 102 can transmit a request to platform 120 for access to a media item 121. Platform 120 may identify the media item 121 of the request (e.g., at data store 110, etc.) and may provide access to the media item 121 via the UI of the content viewer provided by platform 120. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

As illustrated in FIG. 1, platform 120 can include a time marking engine 151. Time marking engine 151 can be configured to determine multiple content segments of the media item 121 and provide segment start indicators indicating the distinct content segments to other users of the platform 120 that request to access the media item 121. In some embodiments, time marking engine 151 can determine which content segments of media item 121 are to be associated with segment start indicator(s) 152 in view of time marks corresponding to each segment. A time mark can refer to an indication of a time period of a timeline of media item 121 for a particular content segment. A segment start indicator refers to an indication of the particular content segment that is provided via the content viewer UI associated with platform 120 (referred to herein as platform UI herein). Each segment start indicator can indicate the beginning of a chapter of the media item. A chapter can refer to the content of a content item between two time marks. Each chapter can be a distinct portion of the media item that can include identifiable or distinguishing content in comparison with other portions of the media item.

In some embodiments, time marking engine 151 can determine one or more time marks associated with a media item 121 using one or more machine-learning models 160. For example, platform 120 can receive (e.g., from a client device 102, etc.) a media item 121 that is to be accessible by users of platform 120. In response to receiving the media item 121, time marking engine 151 can provide an indication of the media item 121 as input to a trained content segment machine-learning model 160. Machine-learning model 160 can be trained to predict, for a given media item, one or more content segments of the given media item depicting distinct portions of the media items (e.g., one or more chapters) to one or more users of platform 120, in accordance with embodiments described herein.

Training data generator 131 (i.e., residing at server machine 130) can generate training data to be used to train model 160. In some embodiments, training data generator 131 can generate the training data based on one or more training media items (e.g., stored at data store 110 or another data store connected to system 100 via network 104). In an illustrative example, data store 110 can be configured to store a set of training media items and metadata associated with each training media item of the set of training media items. In some embodiments, the metadata associated with a respective training media item can indicate one or more characteristics associated with one or more content segments of the media item, such as chapter labels. Each chapter label can include a time mark(s) related to the start and/or end of a particular content segment along the timeline of the media item. The chapter labels can be generated based on user input. For example, for each media item, one or more users can specify the time marks separating each desired content segment of the media item. The training data generator 131 can determine the time marks related to the start of each chapter for each media item of the set of training media items in view of user input.

To generate the training data, training data generator 131 can first use feature extractors 132A-132N to extract, from each training media item, data relating to one or more media item features. Media item features can relate to the video features of a media item, the audio features of a media item, the text data associated with the audio of a media item, etc. By combining video features, audio features and text data associated with each training media item, different types of information are used to train model 160, thereby resulting in more accurate predictions of the trained model 160.

Feature extractors 132A-132N can be part of training data generator 131 (as shown), or independent components hosted by server machine 130 (not shown) or on any other external device or server machine. Feature extractors 132A-132N can be algorithms (such as a k-NN regression algorithm), trained machine-learning models, computer vision models, and any other models that receive, as input, a media item 121 (or one or more content segments of the media item) and generate, as output, feature data representative of one or more particular features of the media item. The feature data can include one or more numerical values (e.g., a vector, a descriptor, a matrix, etc.) that can be processed by the training engine 141. In particular, feature extractors 132A-132N can transform a large and possibly redundant amount of data into a reduced set of feature values. In some embodiments, feature extractors 132A-132N can include a video and/or image feature extractor, an audio feature extractor, a text (e.g., sound data such as speech converted to text) feature extractor, etc. The video feature extractor can be used to generate video feature data corresponding to a media item. Examples of the video feature extractor include any image or video embedding model such as, for example, the EfficientNet model. The audio feature extractor can be used to generate audio feature data corresponding to a media item. Examples of the audio feature extractor includes any audio embedding model such as, for example, the VGGish model. The text feature extractor can be used to generate text feature data corresponding to a media item. Examples of the text feature extractor include text embedding or speech recognition model such as, for example, the universal sentence embedding model.

Feature extractors 132A-132N can generate feature data at a predefined size. For example, each feature extractors 132A-132N can sample the media item at specific time intervals (e.g., at 1 second intervals, at 0.1 second intervals, at 5 second intervals, etc.), at specific data size intervals (e.g., at one-megabyte intervals, at one kilobyte intervals, etc.), etc. Training data generator 131 can combine the feature data generated by one or more feature extractors 132A-132N into the training data. For example, the training data can include combined one second duration data of corresponding video feature data, audio feature data, and text feature data from the same time period of a training media item.

Each instance of the training data related to a media item can include or be associated with corresponding data from each feature extractor 132A-132N along with corresponding metadata (e.g., a chapter label). The chapter label data can be represented using, for example, a designated value (e.g., value of 1) for each second on the timeline of the media item that is the start of a chapter, and another designated value (e.g., value of 0) for each second on the timeline that is not the start of a chapter. For example, a media item can be ten minutes in duration, and include three chapters, the first chapter beginning at the zero second time period of the media item, the second chapter beginning at the three-minute time period of the media item, and the third chapter beginning at the seven minute, twelve second time period of the media item. For each second of the timeline of the ten-minute media item, the training data generator 131 can, using the feature extractors 132A-132N, generate a training instance that includes one second of video feature data, one second of audio feature data, one second of text feature data, and an indication of whether each particular second along the timeline is the start of a chapter. Accordingly, only three instances (the instance generated for the zero second time period of the media item timeline, the three-minute time period of the media item timeline, and the seven minute, twelve second time period of the media item timeline) include the indication (e.g., a value of one) that the particular time period is the start of a chapter. Accordingly, training data related to each media item can be a collection of the instance data for each time period along the timeline of the media item. The instance data can include a time mark to indication the location of the instance data along the timeline.

In some embodiments, content segment machine-learning model 160 can be a supervised machine-learning model. In such embodiments, training data used to train machine-learning model 160 can include a set of training inputs and a set of target outputs for the training inputs. The set of training inputs can include an indication the respective training data of each media item of the set of training media items and an indication of the one or more chapter labels associated with each content segment. For example, the set of training inputs can include a set of instances each including a second of corresponding video feature data, audio feature data, and text feature data, and start time marks of each labeled chapter. The set of target outputs can include an indication of a duration associated with each labeled content segment (e.g., chapter) of the respective training media item.

Server machine 140 may include a training engine 141. Training engine 141 can train the machine-learning model 160 using the training data from training data generator 131. In some embodiments, the machine-learning model 160 can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine-learning model 160 that captures these patterns. The machine-learning model 160 can be composed of, e.g., a single level of linear or non-linear operations (e.g., a support vector machine (SVM) or may be a deep network, i.e., a machine-learning model that is composed of multiple levels of non-linear operations). An example of a deep network is a neural network with one or more hidden layers, and such a machine-learning model can be trained by, for example, adjusting weights of a neural network in accordance with a backpropagation learning algorithm or the like. In other or similar embodiments, the machine-learning model 160 can refer to the model artifact that is created by training engine 141 using training data that includes training inputs. Training engine 141 can find patterns in the training data, identify clusters of data that correspond to the identified patterns, and provide the machine-learning model 160 that captures these patterns. Machine-learning model 160 can use one or more of transformer model, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

A transformer model is a neural network or deep learning model that learns context and meanings by tracking relationships in sequential data like the words in this sentence. Transformer models can apply an evolving set of mathematical techniques, called attention or self-attention, to detect subtle ways that data elements in a series influence and depend on each other. Transformer models can use encoder modules, decoder modules, or a combination of both. The encoder module can include multiple encoding layers that process the input iteratively one layer after another. The decoder module can include multiple decoding layers that process the encoder's output iteratively one layer after another. Each encoder layer can generate encodings that contain information about which parts of the inputs are relevant to each other. The encoder module then passes its encodings to the next encoder layer as inputs. Each decoder layer does the opposite, taking all the encodings and using their incorporated contextual information to generate an output sequence. To achieve this, each encoder and decoder layer can use an attention mechanism. An attention mechanism can use a technique that mimics cognitive attention causing enhancements to some parts of the input data while diminishing other parts. Further details regarding generating training data and training machine-learning model 160 are provided with respect to FIG. 4.

In some embodiments, the training engine 141 can perform one or more error reduction methods to minimize the error between the predicated chapter duration and the ground-truth provided by the user. Ground truth refers to the accuracy of a training set's classification for supervised learning techniques. The error reduction methods can adjust one or more weights during the training of the machine-learning model. In one example, the error reduction method can be a cross-entropy loss method.

Server 150 includes a time marking engine 151. As indicated above, time marking engine 151 can determine one or more time marks associated with a media item 121 using a machine-learning model(s) 160 trained as described herein. In some embodiments, time marking engine 151 can provide an indication of the media item 121 as input to content segment machine-learning model 160 to obtain one or more outputs. The content segment machine-learning model 160 can provide one or more outputs that include predicted time marks identifying each distinct content segment of the media item 121. For example, the time marks can correspond to a particular chapter of the media item. Time marking engine 151 can determine a time period of the timeline of media item 121 that includes the beginning of the chapter and can assign a time mark with the determined time period. Time marking engine 151 can evaluate each time mark assigned based on the content segment's duration identified using outputs of the machine-learning model 160 and can associate the identified start of the content segment with a segment start indicator 152. Time marking engine 151 can store an indication of the segment start indicator 152 for the one or more chapters (particular content segments) at data store 110 (e.g., with metadata for media item 121, etc.). Further details regarding associating content segments with time marks and/or segment start indicators 152 are provided herein.

Time marking engine 151 can include moving window component 155. Moving window component 155 can enable time marking engine 151 to apply trained machine-learning model 160 to different portions of a media item to generate prediction data. In particular, in some embodiments, machine-learning model 160 can be trained using training media items of shorter duration, and therefore will be better used to predict segment boundaries in media items of similar duration. For example, each training media item can be of a twenty-minute duration or less (or, for example, between fifteen and twenty minutes). Training the machine-learning model 160 using training media items shorter than a predetermined duration may allow for faster training, less training data, and easier optimization of the machine-learning model 160. Once trained, machine-learning model 160 can apply, to received input data associated with a media item, an input window of a similar span (e.g., twenty minutes). That is, the span of the input window may be limited by the duration of the media items of the training data. Accordingly, responsive to receiving a media item longer in duration (e.g., a media item of one hour in duration) than the span of the input window (e.g., twenty minutes), time marking engine 151 can apply a moving window (via, for example, moving window component 155) to different portions of the timeline of the media item 121. For example, moving window component 155 can apply machine-learning model 160 to the first twenty minutes of the one-hour long media item, then apply the machine-learning model 160 to the fifteen-minute to thirty five-minute time period of the one-hour long media item, and so forth until machine-learning model 160 is applied to the entire media item. In some embodiments, moving window component 155 can move the input window in response to a stride threshold satisfying a threshold condition. The stride threshold can be a time period value that triggers the input window to be applied to a different portion of the media item. Further details regarding moving window component 155 and the stride threshold are provided herein.

In some embodiments, a client device 102 can transmit a request to access media item 121, as described above. In response to receiving a request to access media item 121, platform 120 can provide the media item 121 for presentation via the platform UI at client device 102. In some embodiments, platform 120 can also transmit an indication of one or more segment start indicators 152 associated with media item 121. The platform UI can include one or more UI elements that indicate a time period of the timeline of the media item 121 that correspond to the one or more segment start indicators 152. In some embodiments, a user of client device 102 can engage with (e.g., click, tap, select, etc.) the one or more UI elements. In response to detecting a user engagement with the one or more UI elements, client device 102 can initiate playback of a respective content segment that corresponds to the segment start indicator(s) 152 associated with the UI elements. Accordingly, the user can access the interesting content segments of the media item 121 without consuming each content segment of the media item 121. Each content segment is likely to cover a different topic (or piece of music), and begin at the point in the media item where that topic begins. Thus, start of the content segment is (or is at least statistically like to be) at a point in the media item which can be easily comprehended. Thus, the user obtains quicker access to the information content of the media item (for example, quicker access than would be obtained by starting to view the media item at a random point, and, if it is midway through the discussion of a topic, skipping forwards or backwards in the media item until a more suitable starting point is reached). Further details regarding the platform UI initiating playback of interesting content segments are provided herein.

It should be noted that although FIG. 1 illustrates time marking engine 151 as part of platform 120, in additional or alternative embodiments, time marking engine 151 can reside on one or more server machines that are remote from platform 120 (e.g., server machine 150). In some embodiments, media item management component 122 can transmit data associated with one or more edits to time marking engine 151 (e.g., via network 108, via a bus, etc.) residing on server machine 150.

It should be noted that in some other implementations, the functions of server machines 130, 140, 150 and/or platform 120 can be provided by a fewer number of machines. For example, in some implementations components and/or modules of any of server machines 130, 140, 150 may be integrated into a single machine, while in other implementations components and/or modules of any of server machines 130, 140, 150 may be integrated into multiple machines. In addition, in some implementations components and/or modules of any of server machines 130, 140, 150 may be integrated into platform 120.

In general, functions described in implementations as being performed by platform 120 and/or any of server machines 130, 140, 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
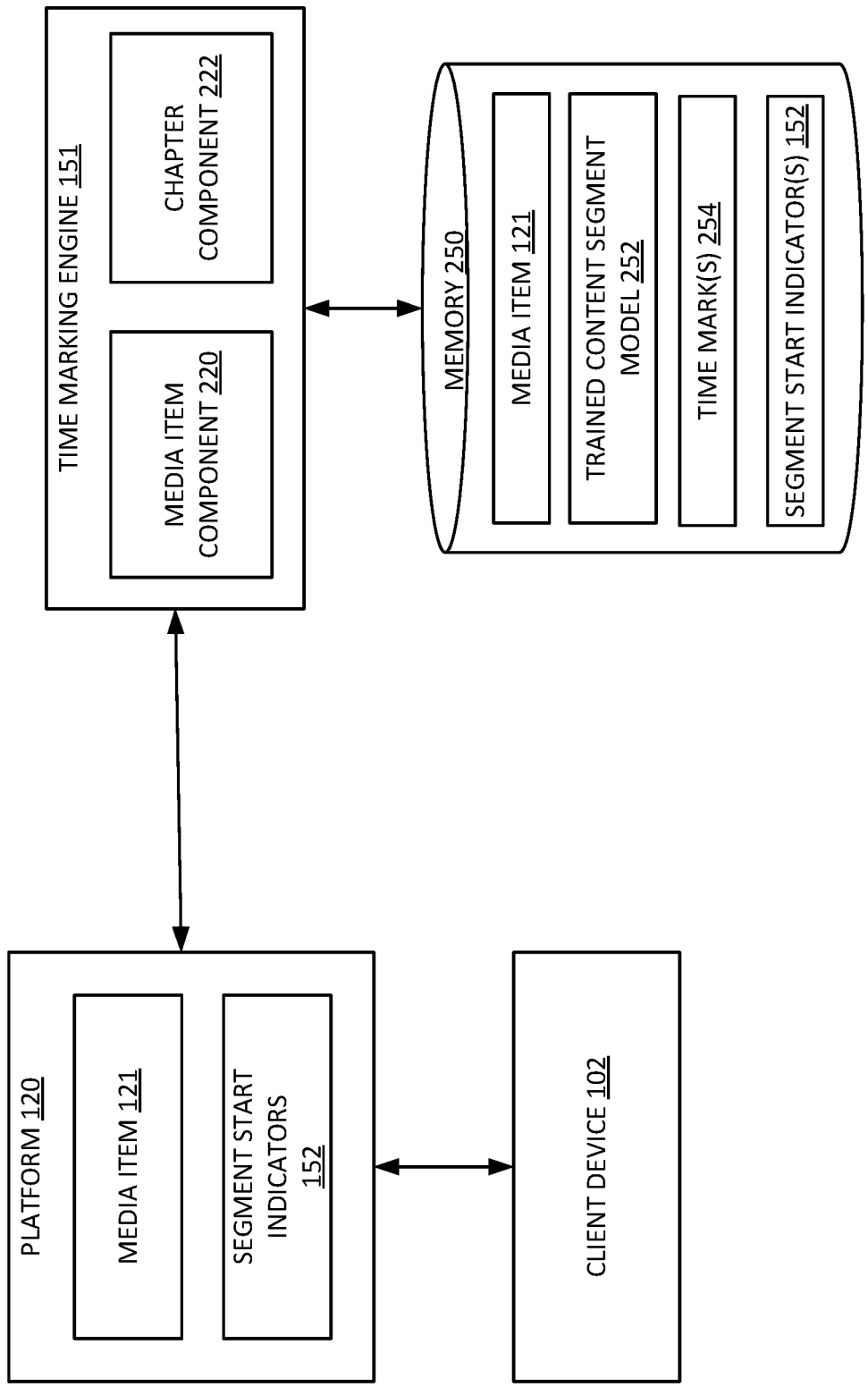
FIG. 2 is a block diagram illustrating an example platform and an example time mark engine, in accordance with implementations of the present disclosure.

FIG. 2 is a block diagram illustrating an example platform 120 and an example time marking engine 151, in accordance with implementations of the present disclosure. In some embodiments, platform 120 and/or time marking engine 151 can be connected to memory 250. One or more portions of memory 250 can correspond to data store 110 and/or another memory of system 100, in some embodiments. In additional or alternative embodiments, one or more portions of memory 250 can correspond to a memory of client device 102.

As described with respect to FIG. 1, platform 120 can provide users with access to media item(s) 121 hosted by platform 120. In some embodiments, media item (s) 121 can be provided to platform 120 by other users of platform 120. In such embodiments, platform 120 can be a content sharing platform. As described above, a user can access a media item 121 via a UI of a content viewer of a client device 102 associated with the user. In some embodiments, the content viewer can be provided by platform 120. In an illustrative example, client device 102 can transmit a request to access a particular media item 121 hosted by platform 120 (e.g., in response to a user selection, etc.). Platform 120 can identify the particular media item 121 (e.g., from one or more media files residing at data store 110) and can provide access to the particular media item 121 via the content viewer, as described above.

In some embodiments, time marking engine 151 can include a media item component 220 and a chapter component 222. Media item component 220 can be configured to identify a media item 121 to be provided to one or more users of platform 120. As indicated above, a creator of media item 121 can provide media item 121 for access by users of platform 120. In response to detecting that the creator has provided (e.g., uploaded) media item 121 to platform 120, media item component 220 can identify the media item 121. In some embodiments, media item component 220 can identify the media item 121 before platform 120 provides media item 121 for access to the users. In other or similar embodiments, platform 120 can receive a request from a client device 102 associated with a user to access media item 121 (e.g., after media item 121 is provided by the creator). In such embodiments, media item component 220 can identify the media item 121 in response to receiving the request.

Chapter component 222 can determine one or more segment start indicators for content segments of media item 121. In response to media item component 220 identifying media item 121, chapter component 222 can provide an indication of media item 121 as input to trained content segment model 252. Trained content segment model 252 can correspond to one or more of model(s) 160, described with respect to FIG. 1. In some embodiments, trained content segment model 252 can be trained to predict, for a given media item, one or more distinct content segments of the given media item each depicting distinguishing content to one or more users of platform 120. Trained content segment model 252 can be trained in accordance with embodiments described above and with respect to FIG. 4, in some embodiments. The one or more predicted content segments can be presented as chapters to all or most users (e.g., a general population of users) of platform 120, in some embodiments.

In response to providing an indication of media item 121 (and/or one or more characteristics of the user and/or client device 102) as input to trained content segment model 252, chapter component 222 can obtain one or more outputs of model 252. As indicated above, the one or more outputs can include time marks 254 identifying a beginning time period of each content segment of media item 121. Accordingly, chapter component 222 can determine a time period of a timeline of media item 121 that includes each distinct content segment and can assign one or more time mark(s) 254 with the determined time period. Chapter component 222 can store an indication of the assigned time mark(s) as time mark(s) 254 at memory 250.

Chapter component 222 can associate a content segment indicated by one or more time mark(s) 254 with a segment start indicator 152. In some embodiments, the one or more outputs of model 252 can indicate that each distinct content segment of media item. Accordingly, chapter component 222 can assign a single time mark 254 to a time period of the timeline of media item 121 that includes the beginning of the distinct content segment. In particular, chapter component 222 can assign multiple time marks 254 to time periods of the timeline of media item 121, as described above. In an illustrative example, a first time mark 254A for media item 121 can be associated with a time period of time T0 (e.g., an initial time period of the media item 121), a second time mark 254B for media item 121 can be associated with a time period of T125 (e.g., 125 seconds from the initial time period), and a third mark 254C for media item 121 can be associated with a time period of T325 (e.g., 325 seconds from the initial time period). It is noted that the first chapter does not need to begin at the initial time period of the media item 121, and can begin at any time of the time period of the media item 121 (e.g., at 20 seconds from an initial time period of the media item 121).

Platform 120 can provide access to a media item 121 to a client device 102 associated with a user of platform 120, as described above. In some embodiments, platform 120 can also provide an indication of segment start indicators 152 associated with the media item. Client device 102 can present the media item 121 to the user via a UI of a content viewer of client device 102, as described above.

Figure 3:
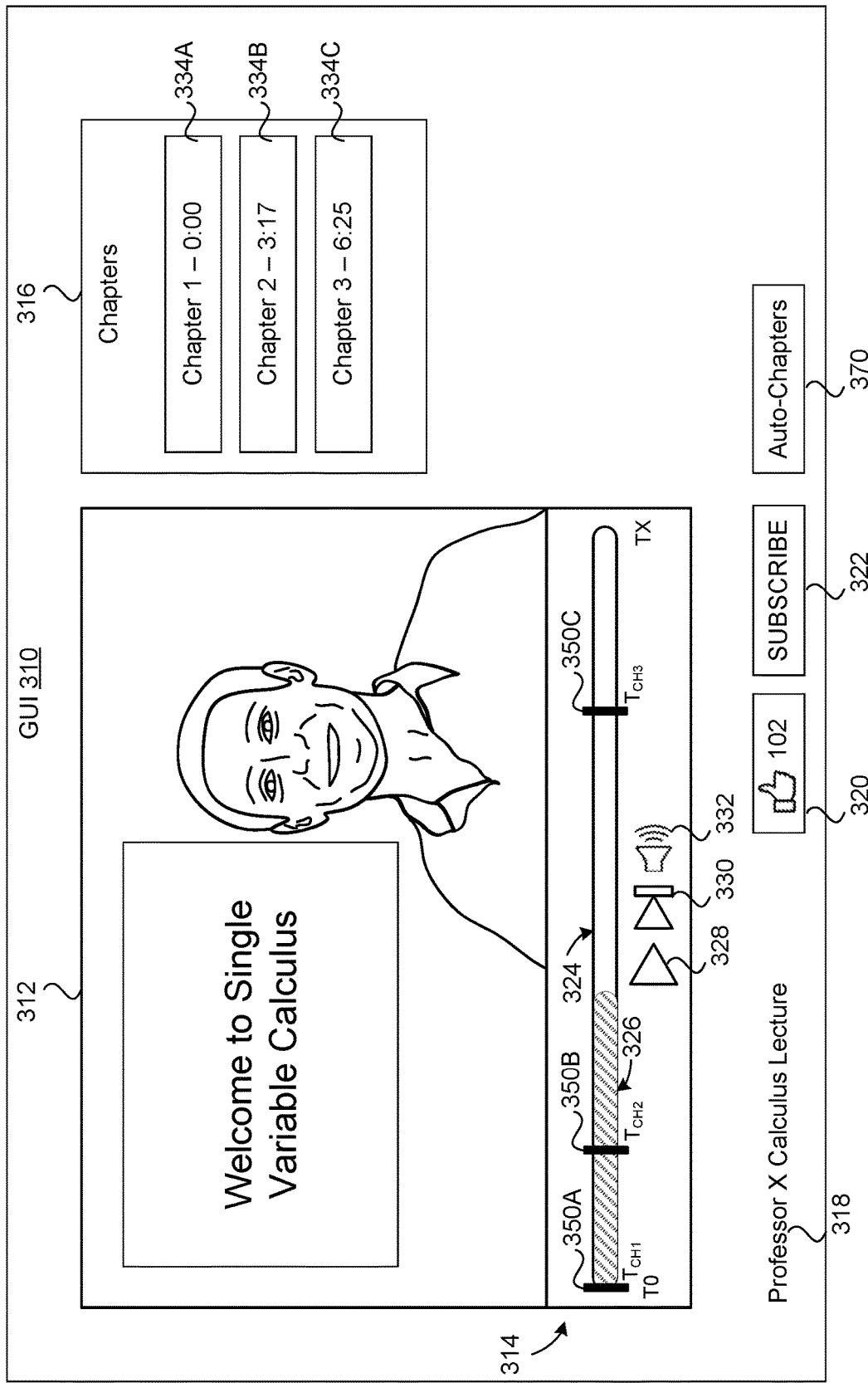
FIG. 3 illustrates an example of chapters for a content segment of a media item based on time marking using machine-learning, in accordance with implementations of the present disclosure.

FIG. 3 illustrates an example of a UI 310 of a content viewer provided by platform 120, in accordance with implementations of the present disclosure. In some embodiments, UI 310 can include one or more of a first section 312, a second section 314, and/or a third section 316. In some embodiments, the first section 312 can be configured to display a media item 121 (e.g., for consumption by one or more users of a client device 102). In an illustrative example, media item 121 can include video content and/or audio content relating to an academic lecture (e.g., a calculus lecture). Platform 120 can provide playback of the media item 121 via the first section 312 of UI 310, in some embodiments.

Second section 314 of UI 310 can include one or more UI elements that enable a user of client device 102 to control playback of the media item 121 via the first section 312 of UI 310 and/or provide an indication of metadata associated with the media item 121. As illustrated in FIG. 3, second section 314 can include one or more UI elements 318 that indicate a title associated with media item 121 (e.g., "Professor X Calculus Lecture"). Second section 314 can additionally or alternatively include one or more elements that enable the user to engage with the media item 121. For example, second section 314 can include one or more UI elements 320 that enable the user to endorse (e.g., "like") the media item 121 and/or one or more UI elements 322 that enable the user to subscribe to a channel associated with the media item 121. UI elements 320 and/or UI elements 322 can additionally or alternatively include information indicating a number of other users that have endorsed the media item 121 and/or have subscribed to a channel associated with the media item 121.

In some embodiments, second section 314 can include one or more UI elements 324 that indicate a timeline associated with the media item 121. A timeline associated with a media item can correspond to a length of a playback of the media item 121. In an illustrative example, playback of media item 121 can be initiated at time T0 (e.g., seconds, minutes, hours, etc.) and can be completed at time TX (e.g., seconds, minutes, hours, etc.). Accordingly, the length of the playback of media item 121 can have a value of X (e.g., seconds, minutes, hours, etc.). As illustrated in FIG. 3, UI elements 324 indicate that the playback of the video is initiated at an initial time period of the timeline (e.g., at time T0) and playback of the video is completed at a final time period of the timeline (e.g., at time TX).

Second section 314 can also include one or more UI elements 326 that indicate a progress of the playback of media item 121 via the first section 312 of UI 310 in view of the timeline of media item 121. One or more characteristics of UI elements 326 (e.g., size, shape, etc.) can change as playback progresses along the timeline of the media item 121. For example, as playback progresses along the timeline of the media item 121 (e.g., from the initial time period at time T0 to the final time period at time TX), the size of UI element(s) 326 can change to indicate time periods of the timeline that include content segments of which playback has been completed. In an illustrative example, UI element (s) 326 can include a timeline progress bar. A size of the progress bar can grow as playback progresses along the timeline of the media item 121 from the initial time period to the final time period. In some embodiments, a user can select with (e.g., click, tap, etc.) a portion of UI element(s) 324 that corresponds to a particular time period of the timeline of media item 121. In response to detecting the user selection, the content viewer can initiate playback of a content segment of the media item 121 that is associated with the particular time period. Platform 120 can update UI element(s) 326 to have a size that corresponds to the particular time period of the timeline that includes the initiated content segment.

Second section 314 can include additional elements that enable a user of client device 102 to control playback of media item 121 via the first section 312 of UI 310. For example, second section 314 can include one or more UI elements 328 that enable a user to initiate playback and/or stop playback of one or more content segments of media item 121. Second section 314 can additionally or alternatively include one or more UI elements 330 that enable the user to terminate playback of the media item 121 and initiate playback of another media item 121. For example, UI element(s) 330 can enable the user to terminate playback of the media item 121 and initiate playback of another media item 121 that is included in a channel associated with the media item 121 and/or is provided by the same creator as the media item 121. In another example, UI element(s) 330 can enable the user to terminate playback of the media item 121 and initiate playback of another media item 121 that is otherwise related to media item 121 (e.g., media item(s) 334 included in third section 316, described below).

As illustrated in FIG. 3, second section 314 can include one or more UI elements 350 that each indicate segment start time indicator(s) 152, determined for content segments of media item 121 by chapter component 222, as described above. A user associated with client device 102 can engage with (e.g., click, select, tap, etc.) UI element(s) 350 to initiate playback of the content segment corresponding with the respective segment start indicator 152. For example, a user can engage with UI element 350B to initiate playback of the content segment included in a time period at time Tau of the timeline for media item 121. In another example, the user can engage with UI element 350C to initiate playback of the content segment included in a time period at time $T_{CH3}$ of the timeline. Accordingly, users of platform 120 can identify and initiate playback of content segments of a media item 121 that are designated as interesting by other users of platform 120 without consuming all of the content segments of media item 121.

In some embodiments, third section 316 can include an indication of one or more chapter buttons (illustrated in FIG. 3 as media items 334A-334C) that are related to the content segments on the timeline included in second section 314. In some embodiments, the chapter buttons 334A-N can be provided for display by platform 120. Each selectable button can indicate chapter number (e.g., chapter 1, chapter 2, chapter 3, etc.) of the media item 121, and a start time of the respective chapter on the timeline UI element 324. For example, chapter button 334A is associated with chapter 1 of the media item 121, and begins at $T_{CH1}$ of the timeline. Chapter button 334B is associated with chapter 2 of the media item 121, and begins at Tau of the timeline. Chapter button 334C is associated with chapter 3 of the media item 121, and begins at $T_{CH3}$ of the timeline. Each chapter button 334A-C can be selected by user input. In response to a user selection of a chapter button 334A-C indicated in third section 316, platform 120 can update UI 310 to initiate playback of the media item 121 at the corresponding time mark on the timeline. For example, responsive to user input selecting chapter button 334B, the platform 120 can update UI 310 to initiate playback of the media item 121 at the 3:17 time period.

In some embodiments, second section 314 can include one or more UI elements 370 that enable the user to request platform 120 to automatically generate chapters for a media item. For example, prior to or after the media item is made available to other users on platform 120, a creator can select the auto-chapters UI element 370, which requests time-marking engine 151 to generate chapters for the media item. In other embodiments, time-marking engine 151 can automatically generate the chapters in response to the creator providing the media item 121 to platform 120.

In some embodiments, UI 310 can include one or more additional UI elements (not shown) that provide information associated with the content segment associated with UI element(s) 310. For example, the one or more additional UI elements can include an indication of a description associated with the content segment or an indication of details associated with the content of the content segment (e.g., a name of characters or actors depicted in the content of the content segment, a location associated with the content of the content segment, etc.). In some embodiments, platform 120 and/or client device 102 can update UI 310 to include the one or more additional UI elements, for example, in response to detecting that a user has engaged with (e.g., tapped, selected, clicked, hovered over, etc.) UI element(s) 310.

Figure 4:
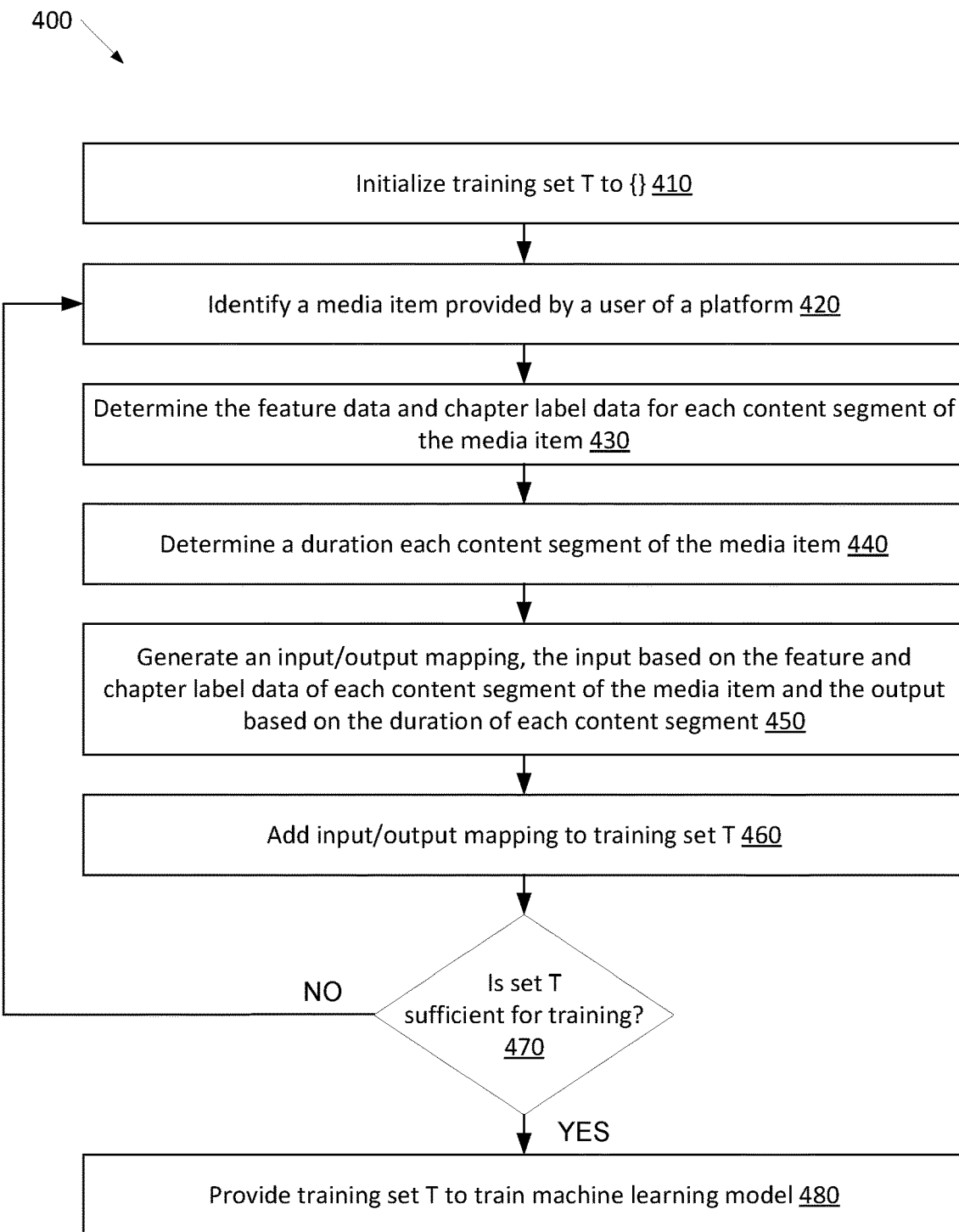
FIG. 4 depicts a flow diagram of an example method for training a machine-learning to predict one or more chapters (e.g., distinct content segments) of a given media item, in accordance with implementations of the present disclosure.

FIG. 4 depicts a flow diagram of an example method 400 for training a machine-learning to predict one or more chapters (e.g., distinct content segments) of a given media item, in accordance with implementations of the present disclosure. Method 400 can be performed by processing logic that can include hardware (circuitry, dedicated logic, etc.), software (e.g., instructions run on a processing device), or a combination thereof. In one implementation, some or all of the operations of method 400 can be performed by one or more components of system 100 of FIG. 1. In some embodiments, some or all of the operations of method 400 can be performed by training data generator 131 and/or training engine 141, as described above.

At block 410, processing logic initiates training set T to { } (e.g., to empty).

At block 420, processing logic identifies a media item provided by a user of a platform. The media item can correspond to media item 121, as described above.

At block 430, processing logic determines the feature data and the chapter label data (e.g., an indication and/or a time mark(s) related to the start and/or end of a content segment along the timeline of the media item) each content segment of the media item. In some embodiments, processing logic can determine the chapter label data and feature data in accordance with embodiments described with respect to FIG. 1. The feature data can include data pertaining to one or more feature types, such as video-related features, image related features, audio related features, etc. Audio related feature can include sound features of audio data or audio transcription features such as text data (e.g., text data can be generated from the audio feature using, for example, speech to text software).

At block 440, processing logic determines a duration of each content segment of the media item. For example, the processing logic can determine the start time period of each content segment of the media item, and determine the duration between the start of each content segment and the start time period of the next content segment of the media item (or between the start time period of a content segment and the end time period of the media item).

At block 450, processing logic generates an input/output mapping, the input based on the feature data and chapter label data, and the output based on a respective duration of each content segment.

At block 460, processing logic adds the input/output mapping to training set T.

At block 470, processing logic determines whether set T is sufficient for training. In response to processing logic determining that set T is not sufficient for training, method 400 can return to block 420. In response to processing logic determining that set T is sufficient for training, method 400 can proceed to block 480.

At block 480, processing logic provides training set T to train a machine-learning model, such as machine-learning model 160 and/or 252, as described above.

In some embodiments, processing logic can perform one or more error reduction methods to minimize the error between the predicated content segment duration and the ground-truth provided by the user. For example, processing logic can use cross-entropy loss method to adjust one or more weights during the training of the machine-learning model.

Once processing logic provides training set T to train the machine-learning model, the machine-learning model can predict, based on a given media item, one or more distinct content segments (e.g., chapters) of the media item.

Figure 5:
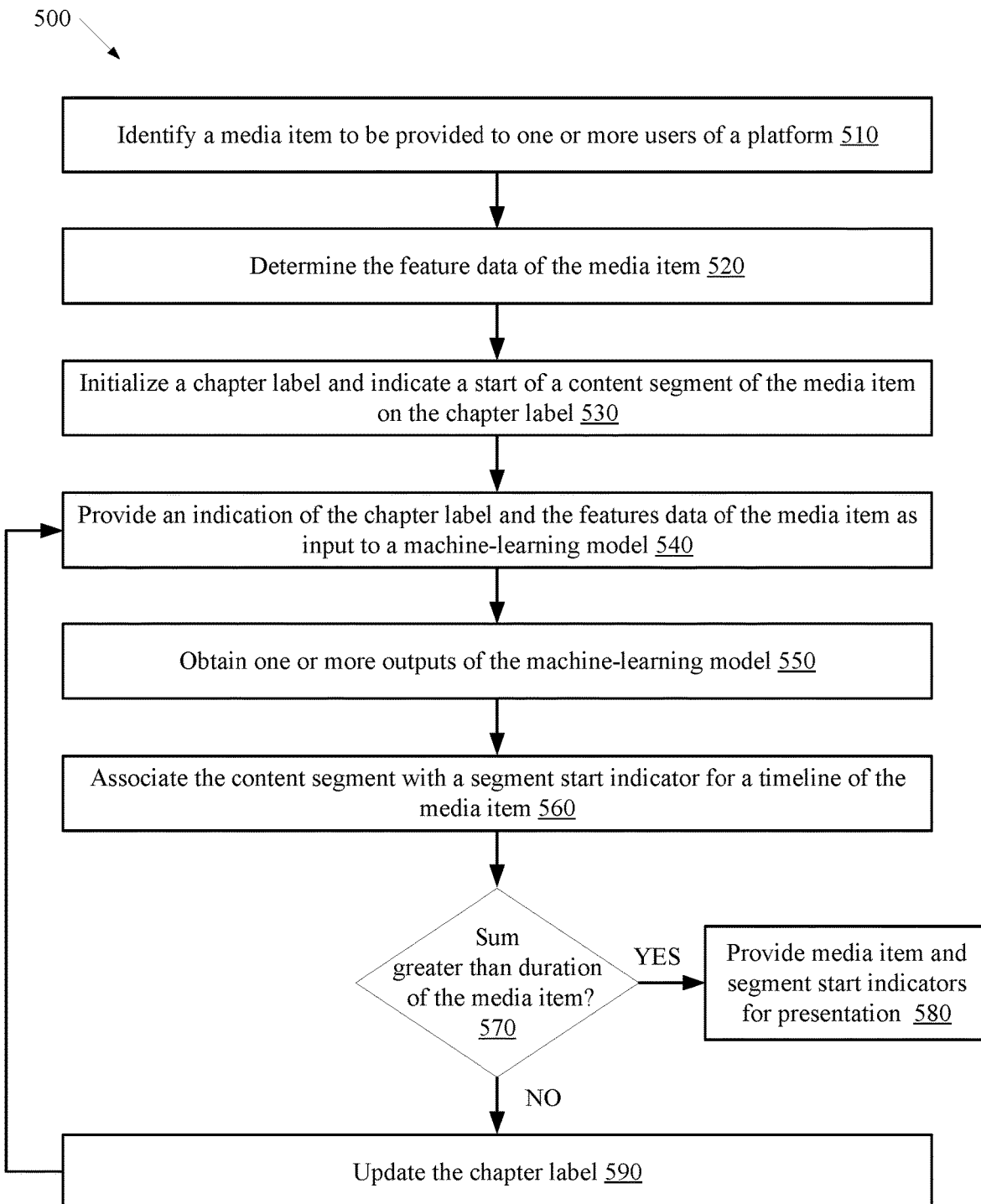
FIG. 5 depicts a flow diagram of an example method for time marking of media items at a platform using machine-learning, in accordance with implementations of the present disclosure.

FIG. 5 depicts a flow diagram of an example method 500 for time marking of media items at a platform using machine-learning, in accordance with implementations of the present disclosure. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some embodiments, some or all of the operations of method 500 can be performed by time marking engine 151, as described above.

At block 510, processing logic identifies a media item to be provided to one or more users of a platform. In some embodiments, the media item can be provided by a creator of the media item and can be identified before the media item is accessible to the one or more users of the platform.

At block 520, processing logic determines the feature data of the media item. In some embodiments, processing logic can determine the feature data in accordance with embodiments described with respect to FIG. 1.

At block 530, processing logic initializes a chapter label and indicate a start of a content segment of the media item on the chapter label. For example, processing logic can initialize the chapter label as a vector of [1, 0, 0, . . . , 0] where the first value (1) sets a time mark for the content segment as the initial time period of the media item 121 (e.g., T0). Each value of the vector can be indicative of a predetermine time length (e.g., one second), where the vector include values to represent the entire duration of the media item (e.g., if the media item is 900 seconds, the vector include 900 values each representing a second of the media item).

At block 540, the processing logic provides an indication of the chapter label and the features data of the media item as input to a machine-learning model. The machine-learning model (e.g., model 252) can be trained using historical media items to predict, for a given media item, one or more distinct content segments (e.g., chapters) of the given media item.

At block 550, processing logic obtains one or more outputs of the machine-learning model. The one or more outputs can include a predicted duration of the content segment.

At block 560, processing logic associates the content segment with a segment start indicator for a timeline of the media item.

At block 570, processing logic determines whether the sum of the time period associated with the time mark and the duration of the content segment are greater than the duration of the media item. For example, if the segment start time period is zero seconds, the predicted duration of the content segment is three hundred seconds, and the media item is nine hundred seconds in duration, then the sum of zero second plus three hundred second is less than the media item duration of nine hundred seconds. Responsive to the sum being equal to or greater than the duration of the media item, processing logic proceeds to block 580, where processing logic provides the media item and an indication of the segment start indicator(s) for presentation to at least one user of the one or more users. Responsive to the sum being less than the duration of the media item, processing logic proceeds to block 590.

At block 590, processing logic updates the chapter label (e.g., vector) by marking (e.g., as "1") the next vector value after the sum of the time period associated with the time mark and the duration of the content segment indicating the start of the next content segment. For example, processing logic can update the vector as [1, 0, 0, . . . 0, 1, 0 . . . 0, 0], where the second "1" value is indicative of the three hundred and first time period. Processing logic can then proceed to block 540.

In some embodiments, processing logic can automatically generate one or more chapter titles for the content segments of the media item using machine-learning. In particular, in response to or after the operations of method 500 time marking each content segment of a media item, an indication of the media item can then be provided as input to another machine-learning model that is trained to predict, for the given media item, chapter titles for the different content segments of the media item. The machine-learning model can be trained using historical data associated with other media items that have been previously provided (e.g., by media item creators) to platform 120. For example, the machine-learning model can be trained using historical data that includes an indication of a respective media item that was previously provided to the platform and indications of different chapter titles for different content segments of the respective media item. More specifically, the machine-learning model can be trained using, as input data, one or more of the media item title, the chapter index (which can include a start time of each chapter of the media item 121), the amount of chapters in the media item 121, audio transcription data (which can include a transcription of the audio data of each content segment generated using a text feature extractor), etc. The output data used to train the machine-learning model can include user-defined titles. Responsive to providing the indication of the segmented media item as input to the trained machine-learning model, the platform can obtain one or more outputs of the model that include predicted chapter titles for each identified content segment of the media item. Accordingly, the platform can automatically assign chapter titles to specific content segments of the media item without a user input.

Figure 6:
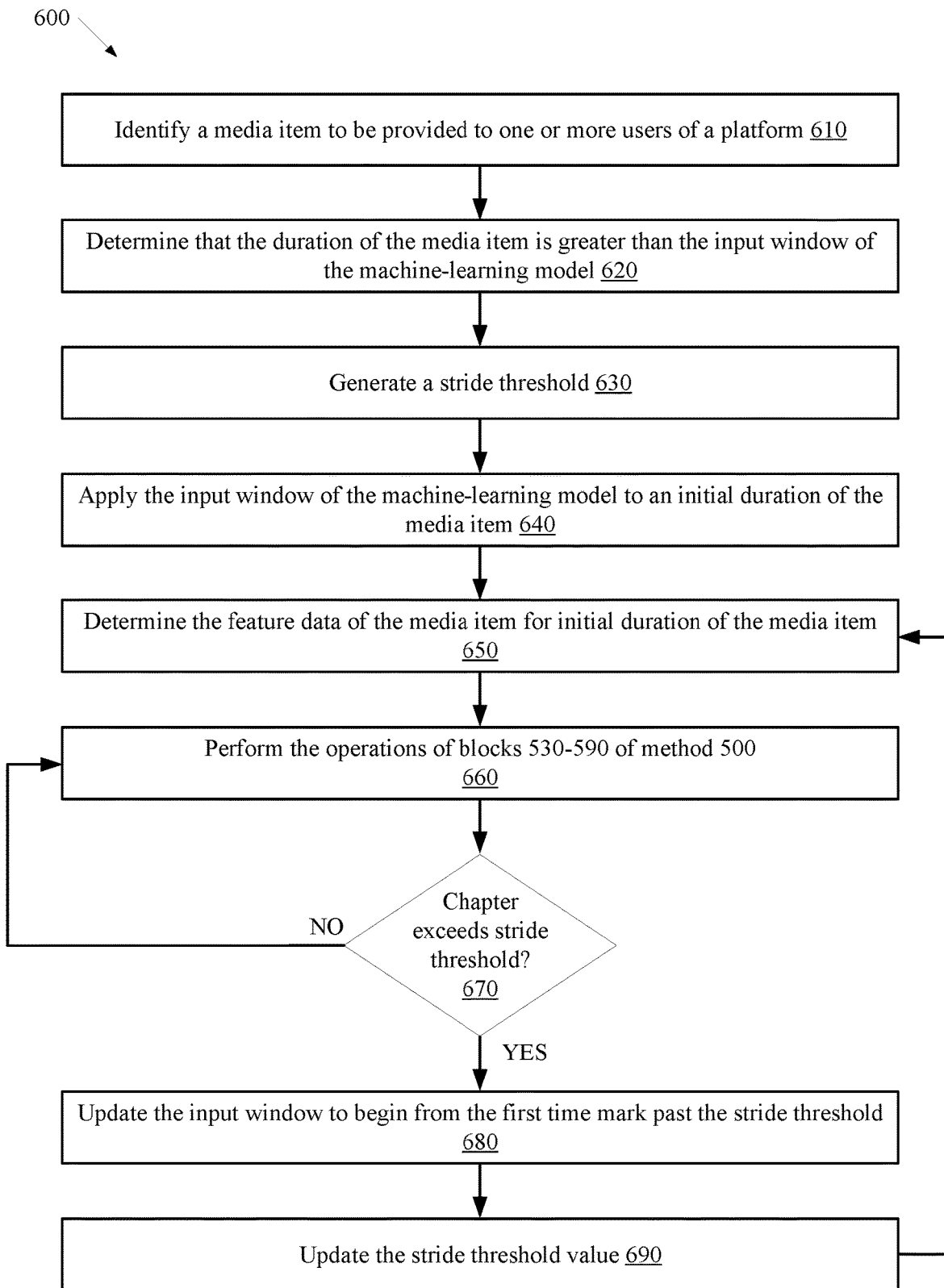
FIG. 6 depicts a flow diagram of an example method for applying a moving window when performing time marking of media items using machine-learning, in accordance with implementations of the present disclosure

FIG. 6 depicts a flow diagram of an example method 600 for applying the moving window when performing time marking of media items using machine-learning, in accordance with implementations of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by time marking engine 151, as described above.

At block 610, processing logic identifies a media item to be provided to one or more users of a platform. In some embodiments, the media item can be provided by a creator of the media item and can be identified before the media item is accessible to the one or more users of the platform.

At block 620, processing logic determines that the duration of the media item is greater than the input window of the machine-learning model. For example, the processing logic can determine that the media item is one hour in duration, and that the input window of the machine-learning model is twenty minutes.

At block 630, processing logic generate a stride threshold. The stride threshold can be a time period value that triggers the input window to be applied to a different portion of the media item. For example, the stride threshold can be a stride threshold value that is set to the ten-minute time period.

At block 640, processing logic applies the input window of the machine-learning model to an initial duration of the media item. For example, an input window of a twenty-minute span can be applied to the first twenty minutes of the hour-long media item by setting the input window to being at the zero second time period of the media item.

At block 650, processing logic determines the feature data of the media item for initial duration of the media item. In some embodiments, processing logic can determine the feature data in accordance with embodiments described with respect to FIG. 1.

At block 660, processing logic performs the operations of blocks 530-590 of method 500. In particular, processing logic can initialize a chapter label and indicate a start of a content segment of the media item on the chapter label (block 530), provide an indication of the chapter label and the features data of the media item as input to a machine-learning model (block 540), obtain one or more outputs of the machine-learning model (block 550), associate the content segment with a segment start indicator for a timeline of the media item (block 560), determine whether the sum of the time period associated with the time mark and the duration of the content segment are greater than the duration of the media item (block 570), and, based on the sum, provides the media item and an indication of the segment start indicator(s) for presentation to at least one user of the one or more users (block 580), or updates the chapter label (block 590).

At block 670, processing logic determines whether the time mark indicative of a chapter exceeds the stride threshold. For example, the processing logic can determine that a first chapter of the media item is twelve minutes in duration, and set the time mark indicative of the second chapter at twelve minutes and one second in block 590. Accordingly, since the twelve minute and one second time mark of the second chapter exceeds (is greater than) the stride threshold value of ten minutes, the processing logic can determine that the time mark indicative of a chapter exceeds the stride threshold. Responsive to determining that the time mark indicative of a chapter exceeds the stride threshold, processing logic proceeds to block 680. Responsive to determining that the time mark indicative of a chapter does not exceed the stride threshold, processing logic proceeds to block 660 to determine the duration of another content segment of the media item.

At block 680, processing logic updates the input window to begin from the first time mark past the stride threshold. Using the previous example, since the second chapter begins at the twelve minute and one second time mark, the processing logic can set the input window of the machine-learning model to being at the twelve minute and one second time period of the media item.

At block 690, processing logic updates the stride threshold value. In some embodiments, processing logic can update the stride threshold value to a next predetermined value. In some embodiments, the stride threshold value can be set to the twenty-minute time period, and then be set to ten minutes forward (e.g., thirty-minute time period, forty-minute time period, etc.) during each stride threshold value update operation. In some embodiments, the stride threshold value can be set based on the position of the input window. For example, responsive to the input window of the machine-learning model being set at the twelve minute and one second time period of the media item, processing logic can set the stride threshold value to a time period that is ten minutes from the start of the input window (e.g., twenty-two minutes and one second). Processing logic then proceeds to block 650 and determines the feature data of the media item for duration indicated by the position of the input window.

Figure 7:
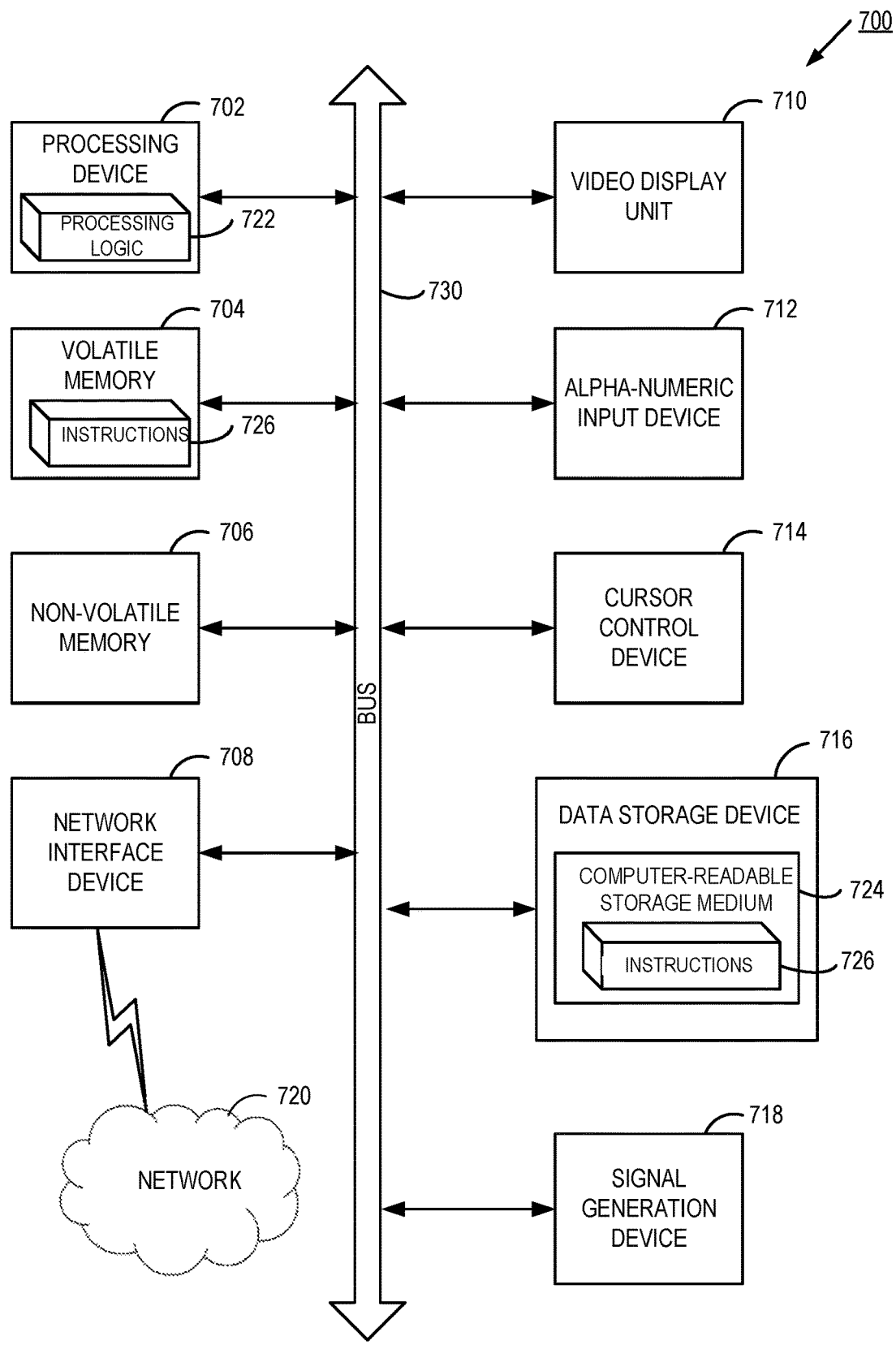
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can correspond to platform 120 and/or client devices 102A-N, described with respect to FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740. Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for time marking of media items at a platform using machine-learning) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for time marking of media items at a platform using machine-learning) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for providing fine-grained version histories of electronic documents at a platform. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    identifying a media item to be provided to one or more users of a platform;
    providing an indication of the identified media item as input to a machine-learning model, wherein the input to the machine-learning model comprises feature data of the media item and a chapter label indicative of a start time of a first content segment of the media item, wherein the machine-learning model is trained using different feature types of historical media items to predict, for a given media item, a plurality of content segments of the given media item each depicting, to the one or more users, a distinct section of the media item;
    obtaining one or more outputs of the machine-learning model, wherein the one or more obtained outputs comprise time marks identifying each of the plurality of content segments of the media item;
    associating each of the plurality of content segments with a segment start indicator for a timeline of the media item;
    determining a resulting duration of a combination of the plurality of content segments for which the time marks were obtained from the one or more of outputs of the machine-learning model; and
    responsive to determining that the resulting duration is less than the duration of the media item, providing, to the machine-learning model, one or more further inputs comprising the feature data and an updated chapter label indicative of a start time of a content segment following the plurality of content segments for which the time marks were obtained.

2. The method of claim 1, wherein the different feature types include video-related features and audio related features.

3. The method of claim 2, wherein the audio related features comprise at least one of sound features or audio transcription features.

4. The method of claim 1, further comprising:
    determining that a duration of the identified media item exceeds a span of an input window associated with the machine-learning model;
    generating a stride threshold; and
    responsive to the stride threshold satisfying a threshold criterion, updating a position of the input window.

5. The method of claim 1, further comprising:
    detecting that at least one user of the one or more users has engaged with a user interface (UI) element of a UI provided to a client device associated with the at least one user by the platform, wherein the UI element corresponds to the segment start indicator; and
    initiating playback of at least one of the plurality of content segments associated with the segment start indicator via the client device.

6. The method of claim 1, wherein the media item is identified responsive to a request from a client device associated with a creator of the media item to provide user access to the media item via the platform.

7. The method of claim 1, wherein the media item comprises at least one of a video item or an audio item.

8. A system comprising:
    a memory device; and
    a processing device coupled to the memory device, the processing device to perform operations comprising:
        identifying a media item to be provided to one or more users of a platform;
        providing an indication of the identified media item as input to a machine-learning model, wherein the input to the machine-learning model comprises feature data of the media item and a chapter label indicative of a start time of a first content segment of the media item, wherein the machine-learning model is trained using different feature types of historical media items to predict, for a given media item, a plurality of content segments of the given media item each depicting, to the one or more users, a distinct section of the media item;

obtaining one or more outputs of the machine-learning model, wherein the one or more obtained outputs comprise time marks identifying each of the plurality of content segments of the media item;

associating each of the plurality of content segments with a segment start indicator for a timeline of the media item;

determining a resulting duration of a combination of the plurality of content segments for which the time marks were obtained from the one or more of outputs of the machine-learning model; and responsive to determining that the resulting duration is less than the duration of the media item, providing, to the machine-learning model, one or more further inputs comprising the feature data and an updated chapter label indicative of a start time of a content segment following the plurality of content segments for which the time marks were obtained.

9. The system of claim 8, wherein the different feature types include video-related features and audio related features.

10. The system of claim 9, wherein the audio related features comprise at least one of sound features or audio transcription features.

11. The system of claim 8, wherein the operations further comprise:
determining that a duration of the identified media item exceeds a span of an input window associated with the machine-learning model;
generating a stride threshold; and
responsive to the stride threshold satisfying a threshold criterion, updating a position of the input window.

12. The system of claim 8, wherein the operations further comprise:
detecting that at least one user of the one or more users has engaged with a user interface (UI) element of a UI provided to a client device associated with the at least one user by the platform, wherein the UI element corresponds to the segment start indicator; and
initiating playback of at least one of the plurality of content segments associated with the segment start indicator via the client device.

13. The system of claim 8, wherein the media item is identified responsive to a request from a client device associated with a creator of the media item to provide user access to the media item via the platform.

14. The system of claim 8, wherein the media item comprises at least one of a video item or an audio item.

15. A non-transitory computer readable storage medium comprising instructions for a server that, when executed by a processing device, cause the processing device to perform operations comprising:
identifying a media item to be provided to one or more users of a platform;
providing an indication of the identified media item as input to a machine-learning model, wherein the input to the machine-learning model comprises feature data of the media item and a chapter label indicative of a start time of a first content segment of the media item, wherein the machine-learning model is trained using different feature types of historical media items to predict, for a given media item, a plurality of content segments of the given media item each depicting, to the one or more users, a distinct section of the media item;

obtaining one or more outputs of the machine-learning model, wherein the one or more obtained outputs comprise time marks identifying each of the plurality of content segments of the media item;

associating each of the plurality of content segments with a segment start indicator for a timeline of the media item;

determining a resulting duration of a combination of the plurality of content segments for which the time marks were obtained from the one or more of outputs of the machine-learning model; and responsive to determining that the resulting duration is less than the duration of the media item, providing, to the machine-learning model, one or more further inputs comprising the feature data and an updated chapter label indicative of a start time of a content segment following the plurality of content segments for which the time marks were obtained.

16. The non-transitory computer readable storage medium of claim 15, wherein the different feature types include video-related features and audio related features.

17. The non-transitory computer readable storage medium of claim 16, wherein the audio related features comprise at least one of sound features or audio transcription features.

18. The non-transitory computer readable storage medium of claim 15, wherein the operations further comprise:
determining that a duration of the identified media item exceeds a span of an input window associated with the machine-learning model;
generating a stride threshold; and
responsive to the stride threshold satisfying a threshold criterion, updating a position of the input window.

19. The non-transitory computer readable storage medium of claim 15, wherein the operations further comprise:
detecting that at least one user of the one or more users has engaged with a user interface (UI) element of a UI provided to a client device associated with the at least one user by the platform, wherein the UI element corresponds to the segment start indicator; and
initiating playback of at least one of the plurality of content segments associated with the segment start indicator via the client device.

20. The non-transitory computer readable storage medium of claim 15, wherein the media item is identified responsive to a request from a client device associated with a creator of the media item to provide user access to the media item via the platform.

* * * * *